Nov. 2, 1965  E. J. H. FIALA ETAL  3,215,455
PLUG-IN CONNECTIONS
Filed May 25, 1961 2 Sheets-Sheet 1
FIG 1
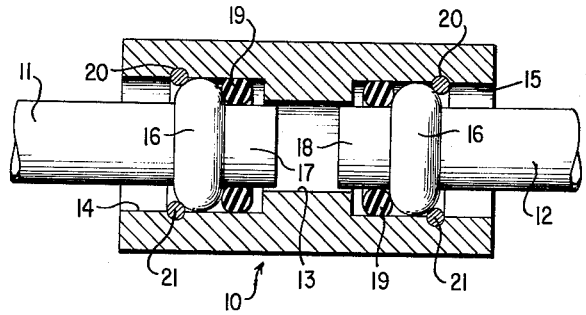
FIG 2
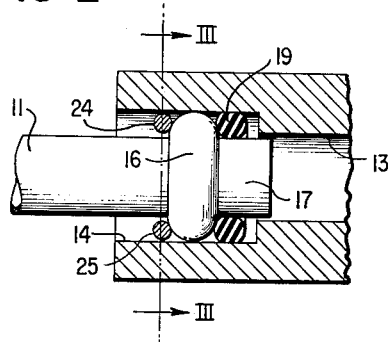
FIG 3
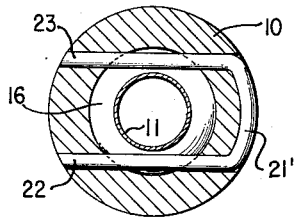
FIG 4
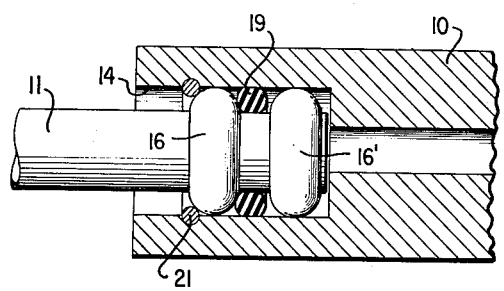
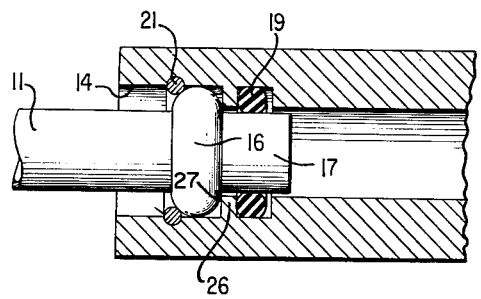
FIG 5
INVENTORS.
ERNST J. H. FIALA
RUDOLF ANDRES
BY
ATTORNEYS.

Nov. 2, 1965    E. J. H. FIALA ETAL    3,215,455
PLUG-IN CONNECTIONS
Filed May 25, 1961    2 Sheets-Sheet 2

INVENTORS.
ERNST J. H. FIALA
RUDOLF ANDRES
BY
ATTORNEYS.

United States Patent Office 3,215,455
Patented Nov. 2, 1965

3,215,455
PLUG-IN CONNECTIONS
Ernst J. H. Fiala and Rudolf Andres, both of Sindelfingen Kreis Boblingen, Germany, assignors to Daimler-Benz Aktiengesellschaft, Stuttgart-Unterturkheim, Germany
Filed May 25, 1961, Ser. No. 112,727
Claims priority, application Germany, May 27, 1960, D 33,447
1 Claim. (Cl. 285—233)

The present invention relates to a readily detachable and movable plug-in connection between the ends of pipe-lines for fluid or gaseous pressure media or between the ends of the pipe-lines and shifting or actuating mechanisms adapted to be placed thereon in vehicles, especially in motor vehicles, with sealing rings sealing the connection toward the outside thereof.

In motor vehicles which are equipped with hydraulically or pneumatically operated mechanisms for moving seats, doors, engine hoods, luggage lids and the like as well as for actuating the locking mechanisms thereof, it is necessary to establish a completely satisfactory, operationally reliable and movable plug-in connection between the ends of the pipe-lines as well as between the ends of the pipe-lines and the shifting or actuating mechanisms and to utilize these plug-in connections for the pipe-lines of the extensive pipe-line system which are to be combined at individual places and are to be secured in common at a motor vehicle part.

Furthermore, it is necessary with these installations to establish an appropriate and operationally reliable plug-in connection between a common main pipe-line and the shifting or actuating mechanisms to be connected therewith which shifting mechanisms are arranged at a place within the vehicle within easy reach of the passenger or driver of the vehicle.

The present invention is concerned with the task to create such a plug-in connection, and essenially consists in movably guiding the end of the pipe-line or the nipples arranged at the end of the pipe-line and constructed as connecting body member by means of a bulge-like guide element within a connecting body member or within the connecting part of the shifting or actuating mechanisms and by form-lockingly connecting the same by means of a securing and safety element as well as safeguarding the same against an automatic release or disengagement.

A further feature of the present invention essentially consists in providing the connecting body member according to one embodiment with a flow or passage bore for a pair of pipe-lines to be connected with each other, while according to another embodiment, several flow or passage bores are provided whereby the connecting places are enlarged by the amount of the bulge-like guide elements arranged at the ends of the pipe-lines whereas the cross-section of the passage bores corresponds approximately to that of the pipe-line ends inserted therein so that a slight amount of play is present between both walls for the required movability of the plug-in connection.

Still a further feature of the present invention resides in providing the connecting body member at the connecting places thereof with groove-like indentations or notches or with bores extending transversely to the longitudinal axis thereof into which are secured securing and safety elements constructed as snap rings or safety bow members, whereas also such safety elements may be provided which are constructed as retaining springs and are provided with slots and gripping or engaging nose portions and which surround the connecting body member during attachment of the pipe-line end to prevent unintentional disengagement thereof from the connecting body member.

Accordingly, it is an object of the present invention to provide a plug-in connection of the type mentioned hereinabove which effectively eliminates the disadvantages and shortcomings of the prior art devices.

It is another object of the present invention to provide a plug-in connection, especially for use in motor vehicles to carry therethrough the liquid or gaseous pressure media, which assures a good seal while, at the same time, enabling limited movability without danger of inadvertent release or accidental disengagement of the detachable parts of the connection.

A still further object of the present invention resides in the provision of a plug-in connection for the ends of pipe-lines, especially for use in motor vehicles, which is simple in construction, reliable in operation, especially as regards fluid-tightness thereof, and which assures a completely adequate safety against inadvertent or accidental loosening of the connecting parts.

These and other objects, features and advantages of the present invention will become more obvious from the following description when taken in connection with the accompanying drawing, which shows, for purposes of illustration only, several embodiments in accordance with the present invention, and wherein FIGURE 1 is a partial cross-sectional view of a first embodiment of a plug-in connection for two pipe-lines;

FIGURE 2 is a partial cross-sectional view of a modified embodiment of a plug-in connection in accordance with the present invention;

FIGURE 3 is a cross-sectional view taken along line III—III of FIGURE 2;

FIGURE 4 is a partial cross-sectional view similar to FIGURES 1 and 2 of a still further modified embodiment of a plug-in connection in accordance with the present invention in which the end of a pipe-line is provided with two bulge-like guide elements;

FIGURE 5 is a partial cross-sectional view through still a further modified embodiment of a plug-in connection in accordance with the present invention;

Figure 6:
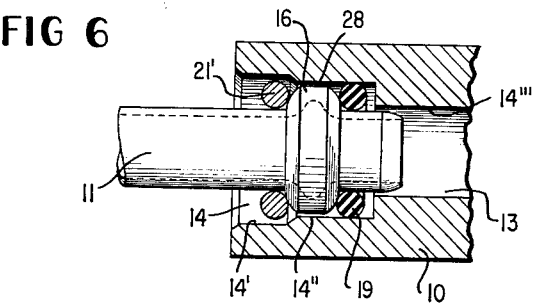
FIGURE 6 is a partial cross-sectional view through still another modified embodiment of a plug-in connection in accordance with the present invention.

Referring now to the drawing wherein like reference numerals are used throughout the various views to designate corresponding parts, and more particularly to FIGURE 1, the plug-in connection illustrated therein essentially consists of a connecting body member generally designated by reference numeral 10 which connects with each other the two ends of the pipe-lines 11 and 12. The connecting body member 10 is provided with a flow or passage bore 13 as well as with one enlarged connecting aperture 14 and 15 each at the respective connecting parts thereof. The ends of the pipelines 11 and 12 provided with bulge-like guide elements 16 are inserted into the enlarged connecting apertures 14 and 15 after one sealing ring 19 each is placed over a respective free end 17 and 18. Snap rings 21 of any suitable known construction are clamped into the grooves 20 provided within the connecting apertures 14 and 15 whereby each bulge-like portion 16 is pressed against a corresponding sealing ring 19, and the pipe-lines 11 and 12 are secured within the connecting body member 10 and are safeguarded against an automatic unintentional disengagement.

As shown in the embodiment illustrated in FIGURES 2 and 3, the ends of the pipe-lines 11 and 12 may be secured by means of a U- or C-shaped securing bow member 21' the leg portions 22 and 23 of which are inserted into the transverse bores 24 and 25 arranged transversely to the connecting apertures 14 or 15.

The end of the pipe-line 11 according to the embodiment of FIGURE 4 is provided with two bulge-like guide elements 16 and 16' between which is arranged the sealing ring 19. In contrast to the embodiments according to FIGURES 1 to 3 and 5 to 8, in which the bulge-like guide element 16 and the free end of the pipe-line 11 or 12 inserted into the flow or passage bore 13 serves the guidance of the respective pipe-lines within the connecting body member 10, the guidance of the end of pipe is taken over in the embodiment of FIGURE 4 by the two bulge-like guide elements 16 and 16'.

Whereas in the embodiments of the plug-in connection according to FIGURES 1 to 4 and 6 to 10, the sealing ring 19 is pressed against the inner wall of the connecting apertures 14 and 15, against the outer surfaces of the pipe-lines 11 and 12 and against the rounded-off portions of the bulge-like guide element 16, the abutment pressure of the sealing ring 19 under stress according to the embodiment of FIG. 5 takes place exclusively against the inner wall of the connecting aperture 14 or 15 and against the outer surface of the pipe end 11. As further sealing means is provided in this embodiment a web portion 26 arranged in an annular manner within the connecting aperture 14, against the edge portion 27 of which, constructed as seating surface for the seal, rests the bulge-shaped guide element 16. The snap ring 21 presses the bulge-shaped portion 16 against the edge portion 27 so that also in this embodiment the required flexibility and movability of the pipeline is assured.

The plug-in connection illustrated in FIGURE 6 which may be constructed as connecting body member 10 or as connecting part of a shifting or actuating mechanism, is provided with a step-shaped connecting aperture 14 whereby the securing bow member 21 is accommodated within the first step 14' and the bulge-shaped portion 16 provided with a cylindrical part 28 along the place of maximum diameter thereof and the sealing ring 19 are accommodated within the second step 14" and the free end of the pipe-line 11 is guided within the third step 14''' which simultaneously represents the flow or passage bore 13. The transition from the first step 14 to the second step 14" is gradual in order to prevent damage to the outer rim of the sealing ring 19 during insertion thereof into the second step 14". The same task is ascribed to the rounded-off rim portion of the free end of the pipe-line 11 over which the sealing ring 19 is pressed whereby the inner diameter of the sealing ring 19 is smaller than the outer diameter of the pipe-line 11. Furthremore, as may be clearly seen from FIGURE 6, the bulge-shaped portion 16 is formed integral with the end of the pipe-line 11, i.e., is made in one piece therewith, whereby the bulge-shaped portion 16 is made in any convenitonal manner as, for example, by upsetting or in-rolling of the pipe end portion or the like.

Figure 7:
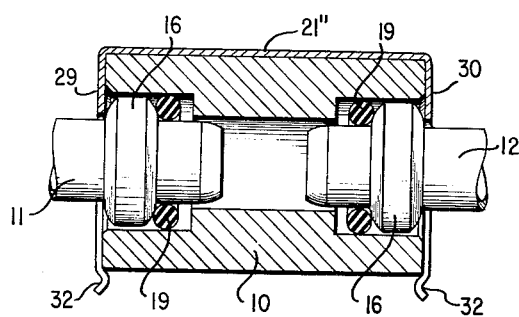
FIGURE 7 is a cross-sectional view through a plug-in connection in accordance with the present invention in which the pipe-line ends are secured by means of a retaining spring.
Figure 8:
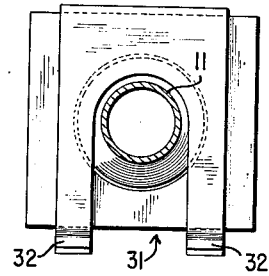
FIGURE 8 is a side elevational view of the plug-in connection of FIGURE 7.

The embodiment of the plug-in connection according to FIGURES 7 and 8 is provided only with another construction of the securing and safety element. The leg portions 29 and 30 of the securing and safety element constructed as retaining spring 21" abut securely against the end faces of the connecting body member 10 whereby the slots 31 provided within the leg portions 29 and 30 surround the pipe ends 11 and 12 in a fork-like manner. The engaging projections or nose portions 32 arranged at the free ends of the leg portions 29 and 30 clamp the retaining spring 21" to the connecting body member 10. Since the leg portions 29 and 30 additionally abut securely against the outer edge of the bulge-like portions 16, the bulge-like portions 16 are thereby pressed against the sealing rings 19 so that the seal and the flexibility or movability of the plug-in connection is also assured with this construction.

The retaining spring 21" can also be constructed as a simple angle-plate or the like whereby one of the leg portions is provided with a slot and with engaging projections or nose portions and is pressed against the end face of the connecting body member 10. The other leg portion resting on the longitudinal side of the connecting body member or on a connecting portion of a shifting or actuating mechanism is then secured thereon by means of screws.

Figure 9:
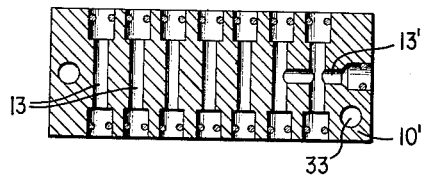
FIGURE 9 is a cross-sectional view through a plug-in connection in accordance with the present invention for several pipe-line connections.

The plug-in connection illustrated in FIGURE 9 represents a connecting body member 10' for several pipe-lines to be connected with each other, whereby a connecting bore 13' is provided arranged transversely to the flow or passage bores 13 which is connected with one or several passage bores 13. The apertures 33 serve for the purpose of securing the connecting body member 10' to the vehicle.

Figure 10:
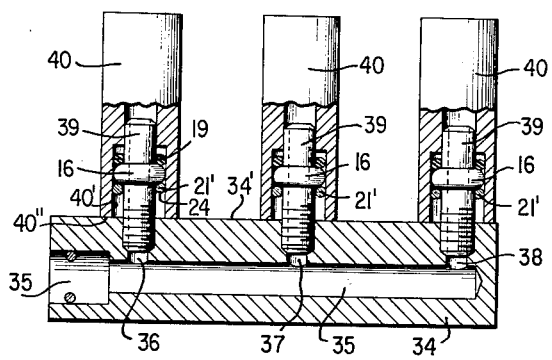
FIGURE 10 is a plug-in connection in accordance with the present invention for a connecting body member with three shifting or actuating mechanisms emplaced thereon.

FIGURE 10 represents a further embodiment of a plug-in connection which is constructed as a connecting body member 34. The connecting body member 34 is connected with a main pipe-line, not illustrated herein, the end of which may also be constructed itself as the connecting body member 34. The connecting body member 34 is provided with a bore 35 in prolongation of the main pipe-line and branch bores 36, 37 and 38 lead from bore 35 to the nipples 39 equipped with bulge-like guide elements 16 over which are mounted or placed, for example, shifting or actuating mechanisms 40 which are secured against inadvertent release or disengagement by means of safety bow members 21'.

The shifting or actuating mechanisms 40 may be of any suitable, conventional construction, such as, for example, disclosed in copending United States application Serial No. 122,330, filed on July 6, 1961, and now Patent No. 3,158,178 in the name of Ernst J. H. Fiala and Rudolf Andres and entitled "Shifting Mechanism."

In particular, the shifting or actuating mechanisms 40, which may be of any suitable construction, are provided with bores 40', the diameters of which correspond to that of the bulge-like portions 16 of the nipples 39. The mechanisms 40 are placed with the bores 40' thereof over the nipples 39 until the surfaces 40" rest against the surface 34 of the connecting body member 34. For purposes of securing the mechanisms 40, the latter are provided within the area of the bores 40' with bores 24 extending essentially parallelly to the surface 40", similar to the bores 24 of FIGURE 2. After emplacing the mechanisms 40 over the rigidly secured nipples 39, the securing bow members 21', as shown in FIGURE 3, are inserted into the bores 24. The securing bow members 21' thereby prevent the unintentional removal of the mechanisms 40 from the nipples 39.

The nipples 39 may be suitably secured at the ends thereof facing the bores 36–38. For example, these ends may be provided with external threads threadably engaging internal threads provided within the connecting body member 34. However, the nipples 39 may also be inserted into corresponding bores provided in the connecting body member 34 and may then be retained in place, for example, by soldering.

While we have shown and described several embodiments in accordance with the present invention, it is understood that the same is not limited thereto, but is susceptible of many changes and modifications within the spirit and scope thereof, and we therefore do not wish to be limited to the details shown and described herein, but intend to cover all such changes and modifications as are encompassed by the scope of the appended claim.

We claim:

A flexible detachable plug-in connection between the end of pipe means adapted to carry a fluid pressure medium and a connecting body member, comprising connecting means arranged adjacent said end of said pipe means including a bulge-like annular guide member having a substantially semi-circular contour and integral with said pipe means but axially displaced from the terminal end thereof, said connecting body member having a bore and a counter bore, said counter bore including cylindrical wall means snugly receiving said bulge-like guide member in substantially line contact, an annular web portion having a rectangular cross section extending radially inward from said cylindrical wall means, said annular web portion terminating radially inwardly in means including an annular edge portion, said body member bore comprising a cylindrical wall, said terminal end of said pipe means extending into said bore and being radially spaced from the walls thereof, an O-shaped sealing ring disposed in said counter bore between said web portion and a shoulder formed between the bore and counter bore and in contact with said annular web portion, the inner circumferential portion of said sealing ring engaging said end of said pipe means between said annular guide member and said terminal end, the outer circumferential portion of said sealing ring engaging said wall of said counter bore, an annular groove in the wall of said counter bore, fastening means including a snap ring having a cylindrical cross section disposed in said groove, said semi-circular contour of said annular guide member being in line contact with said snap ring and with said annular edge portion of said annular web portion, and in line, rocking contact with said wall of said counter bore, said snap ring being effective to place a continuing component of force axially on said end of said pipe means to impose sealing contact between said semi-circular contour and said annular edge portion at all relative positions of said pipe means and said body member including angular misalignment of their respective axes.

References Cited by the Examiner
UNITED STATES PATENTS

| | | | |
|---|---|---|---|
| 549,992 | 11/95 | Bush | 285—150 |
| 2,428,143 | 9/47 | Chavavda | 285—233 |
| 2,440,452 | 4/48 | Smith | 285—321 |
| 2,441,344 | 5/48 | Bosworth | 285—321 |
| 2,499,024 | 2/50 | Hollyday. | |
| 2,535,694 | 12/50 | Payne. | |
| 2,599,389 | 6/52 | Hume | 285—351 X |
| 3,092,404 | 6/63 | MacWilliams | 285—334.4 |

FOREIGN PATENTS

| | | |
|---|---|---|
| 1,223,575 | 2/60 | France. |
| 651,372 | 3/51 | Great Britain. |

CARL W. TOMLIN, *Primary Examiner.*